United States Patent
Syring et al.

(10) Patent No.: US 6,798,651 B2
(45) Date of Patent: Sep. 28, 2004

(54) COMPUTER WITH AN ACCESSIBLE STORAGE MEDIUM DRIVE ASSEMBLY

(75) Inventors: Harold Syring, Temple, TX (US); Rex Karl, Temple, TX (US)

(73) Assignees: Wistron Corp., Shijr (TW); Acer Inc., Hsichih (TW)

(*) Notice: Subject to any disclaimer, the term of this patent is extended or adjusted under 35 U.S.C. 154(b) by 288 days.

(21) Appl. No.: 10/051,964

(22) Filed: Jan. 16, 2002

(65) Prior Publication Data

US 2003/0133388 A1 Jul. 17, 2003

(51) Int. Cl.$^7$ ................................................. G06F 1/16
(52) U.S. Cl. ..................... 361/685; 360/98.01; 248/623
(58) Field of Search ..................... 361/685–687, 361/724–727; 360/98.01, 97.01, 137, 137 D; 369/75.1, 82; 248/618–638

(56) References Cited

U.S. PATENT DOCUMENTS

| | | | | |
|---|---|---|---|---|
| 5,349,483 A | * | 9/1994 | Tsai | 360/97.01 |
| 5,519,571 A | * | 5/1996 | Shieh | 361/685 |
| 6,317,317 B1 | * | 11/2001 | Lu et al. | 361/685 |
| 6,498,722 B1 | * | 12/2002 | Stolz et al. | 361/685 |
| 2003/0193775 A1 | * | 10/2003 | Chang | 361/685 |

* cited by examiner

Primary Examiner—Hung Van Duong
(74) Attorney, Agent, or Firm—Ladas & Parry LLP

(57) ABSTRACT

A computer with an accessible storage medium drive assembly is provided. The computer comprises a chassis, a cradle and an accessible storage medium drive assembly. The cradle, having a first aligning member, is disposed on the chassis. The storage medium drive assembly comprises a carrier, a cable assembly and a storage medium drive. The storage medium drive, disposed on the carrier, is provided with plural first connectors. The cable assembly comprises a backer board, plural second connectors and a second aligning member corresponding to the first aligning member. The backer board is disposed on the carrier, and the second aligning member is disposed on the backer board. The second connector, corresponding to the first connector, is disposed on the backer board. The storage medium drive connects to the cable assembly by the engagement between the first connector and the second connector. The storage medium drive assembly is detachably disposed on the cradle by the engagement between the first aligning member and the second aligning member.

12 Claims, 2 Drawing Sheets

COMPUTER WITH AN ACCESSIBLE STORAGE MEDIUM DRIVE ASSEMBLY

BACKGROUND OF THE INVENTION

1. Field of the Invention

The invention relates to a computer with an accessible storage medium drive assembly; in particular, the invention relates to a computer that mounts the hard disk drive assembly without the use of screws.

2. Description of the Related Art

A typical storage medium drive assembly includes a bracket and a storage medium drive. The bracket is attached to a chassis in a computer by a variety of mounting methods, including screws, or the like. Such storage medium may be a hard drive, a CD-ROM drive, a CD-RW drive, a DVD-ROM drive, a DVD-RW drive or other similar apparatus. Obviously, removal of the storage medium drive assembly requires removal of the screws. Both insertion and removal of the screws are time consuming and cumbersome due to the work space restrictions and difficult accessibility.

The purpose and need to secure the storage medium drive assembly relates to the fact that when the drive operates, the rotational speed of the drive can cause the screws to come loose. This problem is aggravated due to variations in the rotational speed of different drives.

Unfortunately, a suitable solution to the problems associated with accessibility and work space restrictions related to installation, repair or removal of storage medium drive assembly, or the need to secure screws which have become loose due to vibration patterns of the storage medium drive assembly, have not been satisfactorily addressed by the prior art.

In addition, since the storage medium drive assembly has data and power cables that require hand installation, it is more difficult to mount the storage medium drive assembly inside the computer.

SUMMARY OF THE INVENTION

In order to address the disadvantages of the aforementioned computer, the invention provides a computer that mounts the storage medium drive assembly without the use of screws.

Another purpose of this invention is to simplify the replacement of the storage medium drive assembly by the end-user.

Accordingly, the invention provides a computer that comprises a chassis, a cradle and a storage medium drive assembly. The cradle, having a first aligning member, is disposed on the chassis. The storage medium drive assembly, having a second aligning member corresponding to the first aligning member, is detachably disposed on the cradle by the engagement between the first aligning member and the second aligning member.

Furthermore, the storage medium drive assembly comprises a carrier, a cable assembly and a storage medium drive. The cable assembly is disposed on the carrier, and the second aligning member is disposed on the cable assembly. The storage medium drive, disposed on the carrier, connects to the cable assembly.

Furthermore, the storage medium drive is provided with at least one first connector, and the cable assembly comprises a backer board and at least one second connector. The backer board is disposed on the carrier, and the second aligning member is disposed on the backer board. The second connector, corresponding to the first connector, is disposed on the backer board, and the storage medium drive connects to the cable assembly by the engagement between the first connector and the second connector.

Furthermore, the carrier is provided with at least one hook member to retain the backer board.

Furthermore, the carrier is provided with at least one tab, abutting the cradle in a separable manner and protruding from the chassis when the storage medium drive assembly is disposed in the cradle.

Furthermore, the computer further comprises at least one shock isolation member disposed between the cradle and the chassis.

Furthermore, the invention provides a storage medium drive assembly adapted for a computer. The computer is provided with a first aligning member, and the storage medium drive assembly comprises a carrier, a cable assembly and a storage medium drive. The cable assembly, having a second aligning member corresponding to the first aligning member, is disposed on the carrier. The storage medium drive is disposed on the carrier, connecting to the cable assembly, and the hard drive assembly is detachably disposed on the computer by the engagement between the first aligning member and the second aligning member.

BRIEF DESCRIPTION OF THE DRAWINGS

The invention is hereinafter described in detail with reference to the accompanying drawings in which.

DETAILED DESCRIPTION OF THE INVENTION

Figure 1:
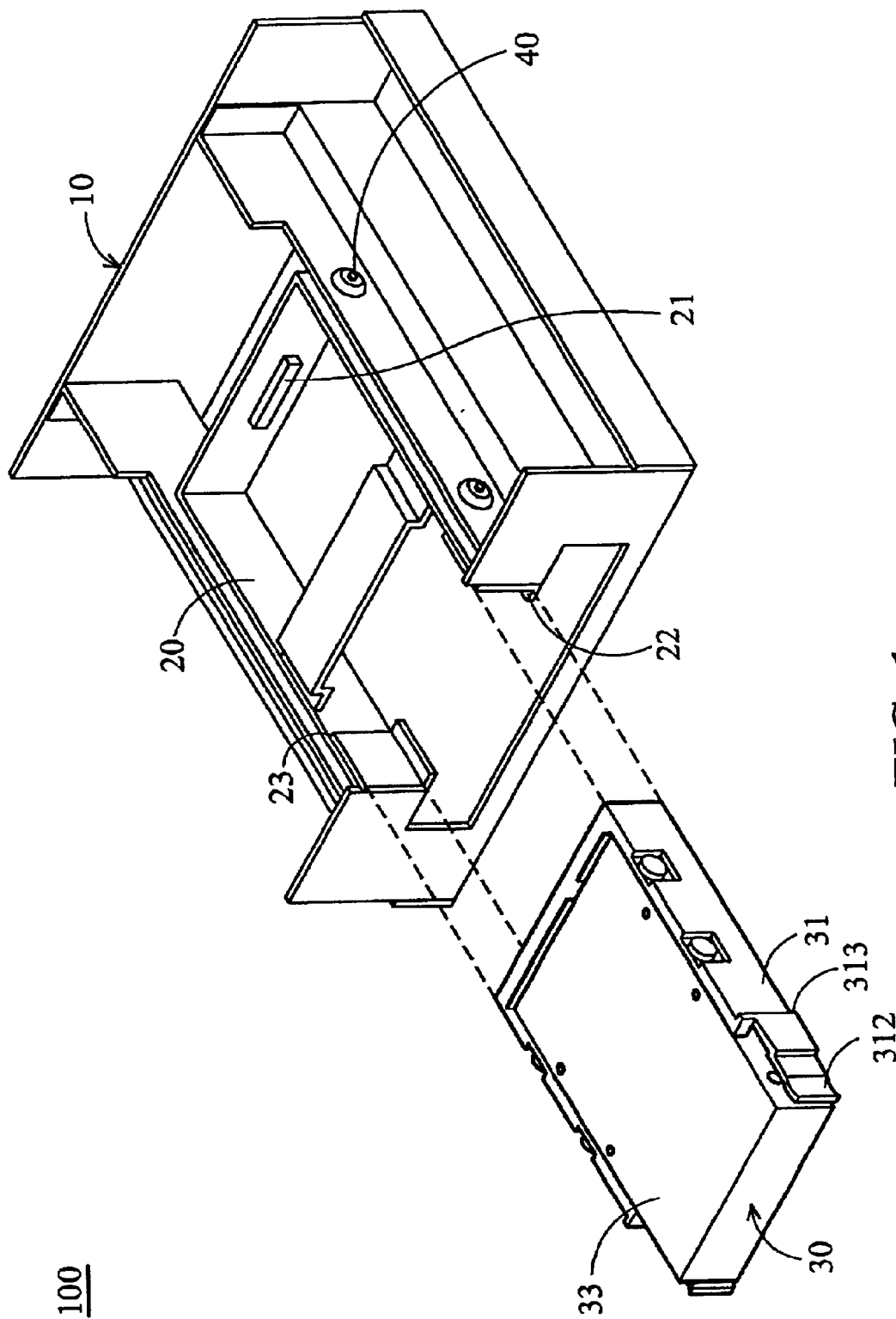
FIG. 1 is an exploded view depicting a computer with a storage medium drive assembly of this invention.

Referring to FIG. 1, a computer 100 of this invention comprises a chassis 10, a cradle 20 and an accessible storage medium drive assembly 30. It is noted that parts, irrelevant to this invention, of the computer 100, such as a motherboard, are not depicted in FIG. 1.

The chassis 10 is a basic frame of the computer 100. The cradle 20 is disposed on the chassis 10 to receive the storage medium drive assembly 30 with a close tolerance interface. The cradle 20 can be mounted on the chassis 10 by a variety of mounting methods, including screws, solder, or the like; however, it is not limited. A first aligning member 21 is disposed at the rear end of the cradle 20 to align the storage medium drive assembly 30 to be mounted with the cradle 20. The cradle 20 is provided with plural protrusions 22 at the bottom end to support the mounted storage medium drive assembly 30. Around both sides of the front end of the cradle 30, first recess portions 23 are formed.

Plural shock isolation members 40 are disposed between the cradle 20 and the chassis 10. It is noted that conventional shock isolation members are used to isolate the storage medium drive assembly from the chassis; that is, the conventional shock isolation members are disposed between the storage medium drive assembly and the chassis. However, the design of this invention allows for close tolerance interface between the storage medium drive assembly 30 and the cradle 20. Also, this design provides the required noise isolation. In addition, the shock isolation member 40 is preferably a rubber grommet.

Figure 2:
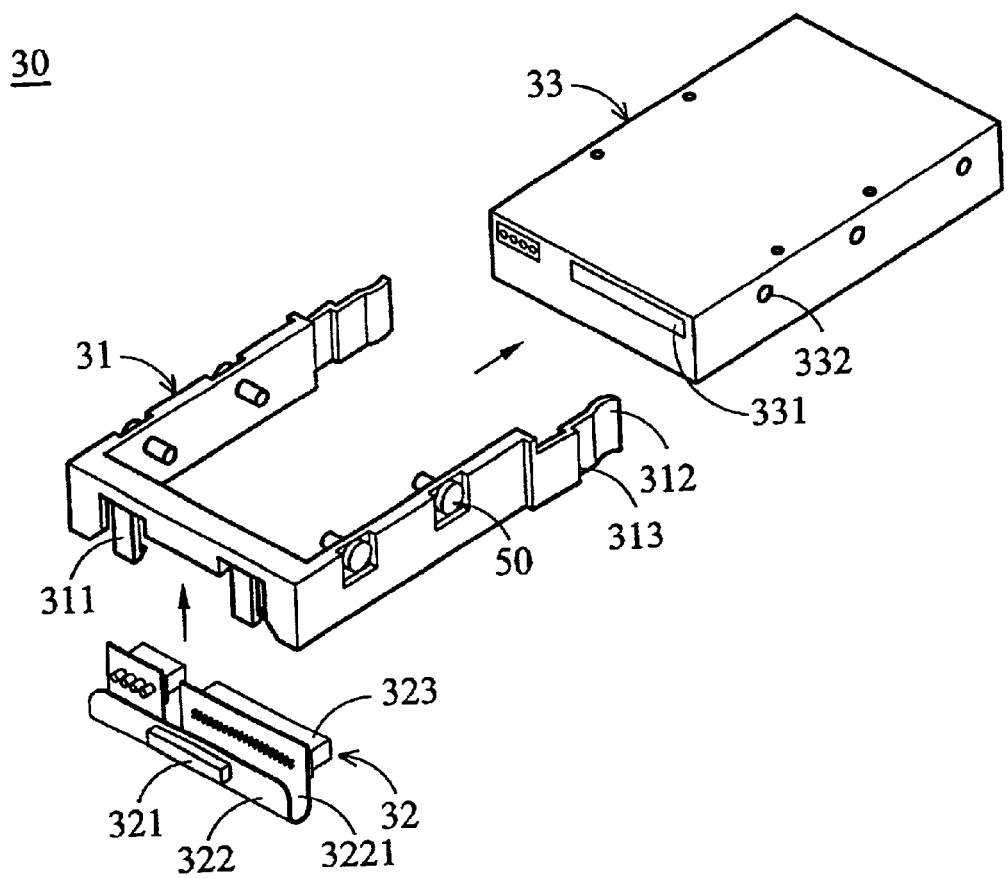
FIG. 2 is an exploded view depicting a storage medium drive assembly of this invention.
Figure 3:
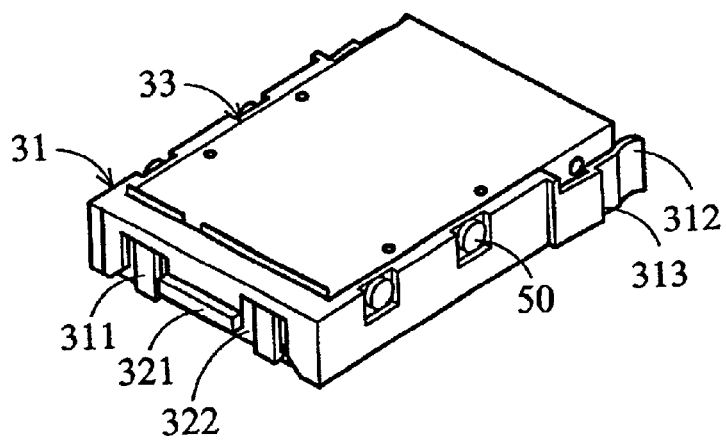
FIG. 3 is a perspective view depicting the storage medium drive assembly of this invention.

Referring to FIG. 2 and FIG. 3, the storage medium drive assembly 30 comprises a carrier 31, a cable assembly 32 and a storage medium drive 33. The carrier 31 is used as a base of the storage medium drive assembly 30. The carrier 31 is provided with two hook members 311 to retain a backer board 322 of the cable assembly 32. Tabs 312 are integrally formed at both sides of the front end of the carrier 31, and are used as hand actuated release members. Adjacent to the tabs 312, two engaging portions 313 are formed to engage the recess portions 23 of the cradle 20 when the storage medium drive assembly 30 is disposed inside the cradle 20.

The storage medium drive 33 is provided with two first connectors 331 and can be disposed on the carrier 31. The storage medium drive 33 is also provided with two holes 332 at both sides.

The cable assembly 32 is used to replace the conventional data and power cables, and comprises a backer board 322, two second connectors 323 and a second aligning member 321 corresponding to the first aligning member 21. The backer board 322 is a "U" shape; therefore, an opening 3221 is formed. When the backer board 322 is disposed on the carrier 31, the opening 3221 surrounds the rear end of the carrier 31. The second aligning member 321 is disposed on the backer board 322, and is used to align the storage medium drive assembly 30 with the cradle 20 by the engagement between the first aligning member 21 and the second aligning member 321. The second connectors 323, corresponding to the first connectors 331 respectively, is disposed on the backer board 322. The storage medium drive 33 connects to the cable assembly 32 by the engagement between the first connectors 331 and the second connectors 323. The storage medium drive assembly 30 is detachably disposed on the cradle 20 by the engagement between the first aligning member 21 and the second aligning member 321.

Four latch members 50 screw into the holes 332 of the storage medium drive 33 to connect the storage medium drive 33 to the carrier 31.

The structure of this invention is described above, and the following description is the mounting method of this invention.

As shown in FIG. 2, the cable assembly 32 is upwardly mounted at the carrier 31 in such a manner that the rear end of the carrier 31 locates inside the opening 3221 of the backer board 322 and the hook members 311 retain the backer board 322 of the cable assembly 32. The storage medium drive 33 is mounted at the carrier 31 in a manner that the first connectors 331 engage with the second connectors 323 and the latch members 50 screw into the holes 332, as shown in FIG. 3.

Then, as shown in FIG. 1, before the storage medium drive assembly 30 is mounted at the cradle 20, the second aligning member 321 faces the first aligning member 21. The storage medium drive assembly 30 is pushed into the cradle 20, with the protrusions 22 supporting, until the engaging portions 313 of the carrier 31 abut against the recess portions 23 of the cradle 20 and the second aligning member 321 engages with the first aligning member 21. Therefore, the storage medium drive assembly 30 is fixedly mounted at the cradle 20.

To remove the storage medium drive assembly 30 from the cradle 20, the tabs 33 are pressed toward the storage medium drive 33 so that the engaging portions 313 and the recess portions 23 separate. The storage medium drive assembly 30 is then pulled outwardly and separated from the cradle 20.

The invention has the following advantages:

1. The design requires no internal access to install or remove the storage medium drive assembly; therefore, the risk of damaging internal components is eliminated;
2. The warranty and liability issues of parts damage are greatly reduced;
3. No hand installation of cables is required; and
4. Users can easily replace the storage medium drive assembly by external access.

While the invention has been particularly shown and described with reference to a preferred embodiment, it will be readily appreciated by those of ordinary skill in the art that is various changes and modifications may be made without departing from the spirit and scope of the invention. It is intended that the claims be interpreted to cover the disclosed embodiment, those alternatives which have been discussed above, and all equivalents thereto.

What is claimed is:

1. A computer comprising;
   a chassis;
   a cradle, having a first aligning member, disposed on the chassis; and
   a storage medium device assembly, having a second aligning member corresponding to the first aligning member, detachably disposed on the cradle by the engagement between the first aligning member and the second aligning member.

2. The computer as claimed in claim 1, wherein the storage medium drive assembly comprises:
   a carrier;
   a cable assembly disposed on the carrier, wherein the second aligning member is disposed on the cable assembly; and
   a storage medium drive, disposed on the carrier, connecting to the cable assembly.

3. The computer as claimed in claim 1, further comprising:
   at least one shock isolation member disposed between the cradle and the chassis.

4. The computer as claimed in claim 2, wherein the storage medium drive is provided with at least one first connector, and the cable assembly comprises:
   a backer board disposed on the carrier, wherein the second aligning member is disposed on the backer board; and
   at least one second connector, corresponding to the first connector, disposed on the backer board, wherein the storage medium drive connects to the cable assembly by the engagement between the first connector and the second connector.

5. The computer as claimed in claim 2, wherein the carrier is provided with at least one tab, abutting the cradle in a separable manner and protruding from the chassis when the storage medium drive assembly is disposed in the cradle.

6. The computer as claimed in claim 2, wherein the cradle is formed with a recess portion, and the carrier is formed with an engaging portion engaging the recess portion.

7. The computer as claimed in claim 3, wherein the shock isolation member is a rubber grommet.

8. The computer as claimed in claim 4, wherein the carrier is provided with at least one hook member to retain the backer board.

9. A storage medium drive assembly adapted for a computer, wherein the computer is provided with a first aligning member and the storage medium drive assembly comprises:

a carrier;

a cable assembly, having a second aligning member corresponding to the first aligning member, disposed on the carrier; and a storage medium drive, disposed on the carrier, connecting to the cable assembly, wherein the storage medium drive assembly is detachably disposed on the computer by the engagement between the first aligning member and the second aligning member.

10. The storage medium drive assembly as claimed in claim 9, wherein the storage medium drive is provided with at least one first connector, and the cable assembly comprises:

a backer board disposed on the carrier, wherein the second aligning member is disposed on the backer board; and at least one second connector, corresponding to the first connector, disposed on the backer board, wherein the storage medium drive connects to the cable assembly by the engagement between the first connector and the second connector.

11. The storage medium drive assembly as claimed in claim 9, wherein the carrier is provided with at least one tab, abutting the computer in a separable manner and protruding from the computer when the storage medium drive assembly is disposed in the computer.

12. The storage medium drive assembly as claimed in claim 10, wherein the carrier is provided with at least one hook member to retain the backer board.

* * * * *